United States Patent
Riley

(10) Patent No.: US 6,175,848 B1
(45) Date of Patent: *Jan. 16, 2001

(54) VARIABLE ACCUMULATION CORRELATORS

(75) Inventor: Stuart Riley, San Francisco, CA (US)

(73) Assignee: Trimble Navigation Limited, Sunnyvale, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/754,693

(22) Filed: Nov. 21, 1996

(51) Int. Cl.[7] .................................................. G06F 7/38
(52) U.S. Cl. ..................... 708/300; 708/304; 375/208; 375/343
(58) Field of Search ................. 364/724.011, 724.02, 364/728.03, 728.07, 737, 745.03, 748.04, 769; 375/208, 343; 701/213; 342/357, 92; 708/300, 304, 422, 426, 530, 552, 573, 671

(56) References Cited

U.S. PATENT DOCUMENTS

| | | | |
|---|---|---|---|
| 4,224,679 | * | 9/1980 | Nossen et al. ........................ 364/728 |
| 4,551,816 | * | 11/1985 | Hyatt .................................... 364/724 |
| 4,559,607 | * | 12/1985 | Lu ........................................ 364/728 |
| 4,686,655 | * | 8/1987 | Hyatt ...................................... 367/59 |
| 4,727,504 | * | 2/1988 | Van Broekhoven ................. 364/724 |
| 4,860,239 | * | 8/1989 | Baron .............................. 364/728.03 |
| 5,415,045 | * | 5/1995 | Wadaka et al. ........................ 73/602 |

\* cited by examiner

Primary Examiner—Ayaz R. Sheikh
Assistant Examiner—Tim Vo
(74) Attorney, Agent, or Firm—William E. Pelton, Esq.

(57) ABSTRACT

This invention provides apparatus and methods for obtaining information for aligning a reference signal with a received signal for global positioning satellite receivers which employs at least one correlator for correlating the received signal with the reference signal to generate an accumulated result; the correlator having a comparator to compare the received signal with the reference signal and an accumulator which is either selectively enabled/disabled to prevent overflow errors or is read periodically before an overflow occurs.

20 Claims, 3 Drawing Sheets

VARIABLE ACCUMULATION CORRELATORS

FIELD OF THE INVENTION

This invention relates to variable accumulation correlators for use in aligning one signal with another signal and, in particular, for use in estimating corrections for aligning a received signal with a reference signal for global positioning satellite (GPS) receivers.

BACKGROUND OF THE INVENTION

In global positioning satellite receivers, one or more correlators are used to "lock" or "align" a reference signal generated by the receiver with a received satellite signal so that information from the received satellite signal can be obtained. The received satellite signal has carrier and code components which are tracked by the receiver. Each correlator continuously compares the received satellite signal with a particular reference signal and generates a correlation signal indicating the on-going result of the comparison. The power of this correlation signal is measured and is repeatedly or continuously accumulated for a period of time called a "pre-detection interval" (PDI). The signal powers measured by the receiver are usually represented by voltage within the circuitry of the receiver. The time period of the pre-detection interval is selected so that the spread spectrum signal transmitted by the global positioning satellites can be discerned from any noise interference in the received satellite signal. This accumulated result is then used to adjust the reference signal to be better aligned with the received satellite signal during the next pre-detection interval. A short summary of the operation of a global positioning satellite receiver is provided below. A detailed discussion can be found in J. J. Spilker, Jr., *Digital Communications By Satellite,* Prentice-Hall, Inc., 1977.

When, as a result of these adjustments, the received signal and the reference signal become aligned in time, that is, the reference signal is punctual ("P") with respect to the received signal, the accumulated result has a maximum value. Similarly, if the received signal and the reference signal are not aligned, the accumulated result has a lower value corresponding to how closely the signals are aligned in time. In other words, if the reference signal is leading or early ("E"), or lagging or late ("L"), with respect to a reference signal, the accumulated result will be less than the maximum value.

FIG. 1 illustrates the possible accumulated result values for ideal conditions, which are a measure of the correlation signal power, with respect to the difference in time ("phase") between the received satellite signal and the reference signal. In global positioning systems, this graph 10 is referred to as a "correlation function".

Because the correlation function is ideally a triangular peak (some asymmetry and rounding is introduced by signal filtering in other parts of the receiver and by other effects), the value of a single accumulated result 11 is found on either side of the maximum accumulated result 12, see points 14 and 16 in FIG. 1. Therefore, by itself, a single accumulated result does not indicate whether to advance or delay the reference signal in time for the next pre-detection interval to get closer to the maximum, that is, where alignment between the received satellite signal and the reference signal occurs.

To provide this 'steering' information, most receivers employ at least one other correlator designated to receive an early version ("early correlator") and/or a late version ("late correlator") of the reference signal in addition to the "punctual" correlator receiving the punctual version of the reference signal.

FIG. 2 illustrates the operation of one such multiple correlator receiver. Under most conditions, when the punctual reference signal is aligned with the received signal, the early correlator and the late correlator produce accumulated results which have a known relationship with respect to each other, typically the same value, and a known relationship with respect to the accumulated results of the punctual correlator as shown by the accumulated results 20, 21, 22. Because the receiver knows the relationship between the correlators when the received signal and the punctual reference signal are aligned, the receiver can calculate whether to advance or delay the reference signals for the next pre-detection interval to achieve alignment. For example, in FIG. 2, the punctual reference signal is "early", as indicated by the location of points 24, 25, 26 to the left of the locations of points for the known relationship 20, 21, 22, respectively. From this information, the receiver knows that the punctual, early and late reference signals should be advanced in time for the next pre-detection interval to better align the reference signals with the received signal, that is, to move the accumulated result of the punctual correlator for the next pre-detection interval to the "peak" of the correlation function as illustrated by arrows 27, 28, 29.

One common variation of this procedure is to subtract the late correlation signal from the early correlation signal to generate an "early-minus-late" correlation signal which is accumulated from an early-minus-late correlator. Thus, for example in the illustration in FIG. 2, the accumulated result of the early-minus-late correlator is a negative number which indicates that the reference signal should be advanced in time for the next pre-detection interval.

The accumulated result for a correlator also varies according to the received signal strength. To account for this variation, receivers typically include additional correlators to generate accumulated results for other reference signals that are shifted in time one-quarter cycle, that is 90 degrees, with respect to a corresponding reference signal. These additional reference signals are called quadrature reference signals ("Q") in contrast to the in-phase ("I") reference signals. Since the received signals and reference signals are primarily sinusoidal, when an in-phase signal is at its maximum power the corresponding quadrature signal has zero power. Therefore, the receiver knows that the highest possible accumulated result for a particular pre-detection interval is calculated by accumulating the in-phase signal when the quadrature signal is zero. Receivers can include both in-phase and quadrature correlators for each point in time being measured. In other words, if a receiver has an early in-phase ("EI") correlator as well as a late in-phase ("LI") correlator, then the receiver may also have a corresponding early quadrature ("EQ") correlator and a late quadrature ("LQ") correlator.

In an ideal system, no matter how large is the accumulated result for a particular correlator, the hardware and/or software is able to represent the appropriate value for that accumulated result. However, in an actual system, the largest value that can be represented is limited by the storage capacity of the components of the receiver. In an analog system, the capacity could be a maximum voltage on an integrating capacitor. In a digital system, the maximum accumulated result is limited by the number of bits which can be stored in the accumulation register ("accumulator") of the correlator. Thus, for example, the maximum possible count can be +/−7 for a four-bit accumulator. In this example, if the accumulated result is 10, then the accumulator will limit, that is overflow, during the pre-detection interval and an erroneous accumulated result will be used in the calculations for adjusting the reference signal for the next pre-detection interval.

In one experiment with a conventional channel circuit using fixed correlator accumulators of 17 bits and a pre-detection interval set to 5 milliseconds, some correlators limited, that is, overflowed, when the received satellite signal's strength, was greater than 54 decibels-Hertz.

One solution to this overflow problem is to employ correlator accumulators which are sufficiently large, that is, have enough bits to accumulate large accumulated results. However, larger accumulators are implemented with more gates increasing both monetary and power consumption costs. For example, in one receiver implemented on an application specific integrated circuit (ASIC), each extra bit for an accumulator requires a flip flop, each flip flop requiring 7.5 gates and about 9 gates for control logic, thereby requiring a total of 16.5 gates per bit. Therefore, in this example, if 2 bits are added to each accumulator to deal with the overflow, and each channel has 4 accumulators (a separate channel is usually used to track one received satellite signal) and each ASIC has 12 channels (although some receivers have 48 channels or more), a total of 1584 additional gates are required:

2 (the number of extra bits)×12 (the number of channels)×4 (correlators/channel)×16.5=1584 gates.

These gates could be used for other functions on the ASIC and also require additional power, for example, about 40–160 microWatts per bit which can be significant for battery-powered GPS receivers.

Another solution is to scale down the correlation signals to values low enough such that the overflow condition in the worst case will not occur, for example, divide by some number. However, scaling to the worst case condition substantially degrades the signal-to-noise ratio.

The present invention provides solutions to this overflow problem without requiring larger accumulators or scaling.

BRIEF SUMMARY OF THE INVENTION

An object of the present invention is to provide apparatus and methods to allow a global positioning receiver to maximize the accumulated results of the correlators without degrading receiver performance.

Another object of the present invention is accumulate correlation data to the maximum extent permitted by the system hardware and then to use software to supplement this hardware limitation with software accumulation.

A further object of the present invention is accumulate the correlator output until the accumulated result overflows; at which time all the correlator accumulations are stopped and the reference signal adjustment calculations are performed.

An additional object of the present invention is to provide an apparatus for obtaining information for aligning a reference signal with a received signal having at least one correlator for correlating the received signal with a respective version of the reference signal to generate an accumulated result; each correlator having a comparator for comparing the respective reference signal with the received signal to generate a correlation signal; and a selectively enabled accumulator for accumulating the correlation signal to generate the accumulated result. Also, the accumulator may have: (1) a reset which may zero the accumulator; (2) an indicator of an overflow condition; and/or (3) an input for receiving an enable signal for selectively being enabled. In addition, the indicator may generate an overflow signal and the overflow signals may be combined.

Also, an object of the present invention is to provide a method for obtaining information for aligning a reference signal with a received signal by: (1) comparing the received signal and the reference signal; (2) generating a correlation signal from the comparison; (3) accumulating the correlation signal as an accumulated result; and (4) stopping the accumulation if an overflow condition occurs. The method may also include the steps of: (1) reading the accumulated result; and/or (2) accumulating the accumulated result in an accumulated total.

Another object of the present invention is to provide an apparatus for obtaining information for aligning a reference signal with a received signal having at least one correlator for correlating the received signal with a respective version of the reference signal to generate an accumulated result; and at least one controller for controlling reading of the accumulated result at predetermined intervals, the predetermined intervals being less than a pre-detection interval such that each correlator has: (a) a comparator for comparing the respective reference signal with the received signal to generate a correlation signal; and (b) an accumulator for accumulating the correlation signal. This apparatus may also have a reset for resetting the accumulator.

A further object of the present invention is to provide a method for obtaining information for aligning a reference signal with a received signal by: (1) comparing the received signal and the reference signal; (2) generating a correlation signal from the comparison; (3)accumulating the correlation signal as an accumulated result; and (4) reading the accumulated result before an overflow condition is expected to occur. This method may also include the steps of: (1) adjusting the accumulated result if an overflow has occurred; and/or (2) accumulating the accumulated result in an accumulated total. Also, the overflow condition of this method may be a second overflow of the accumulated result.

DETAILED DESCRIPTION OF THE INVENTION

Figure 1:
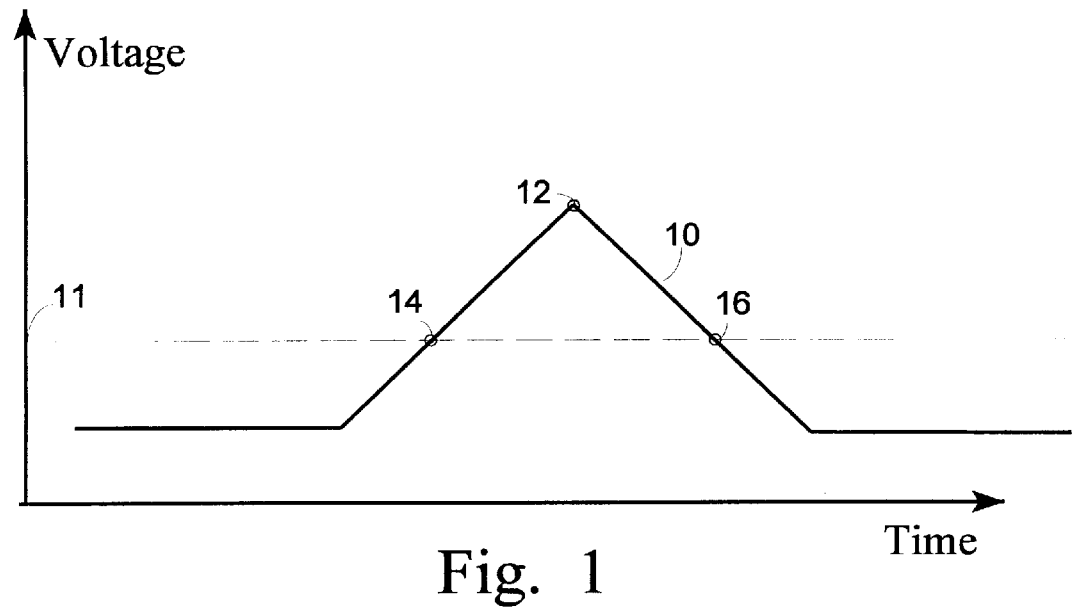
FIG. 1 is a graphical representation of a correlation function employed by the present invention.
Figure 2:
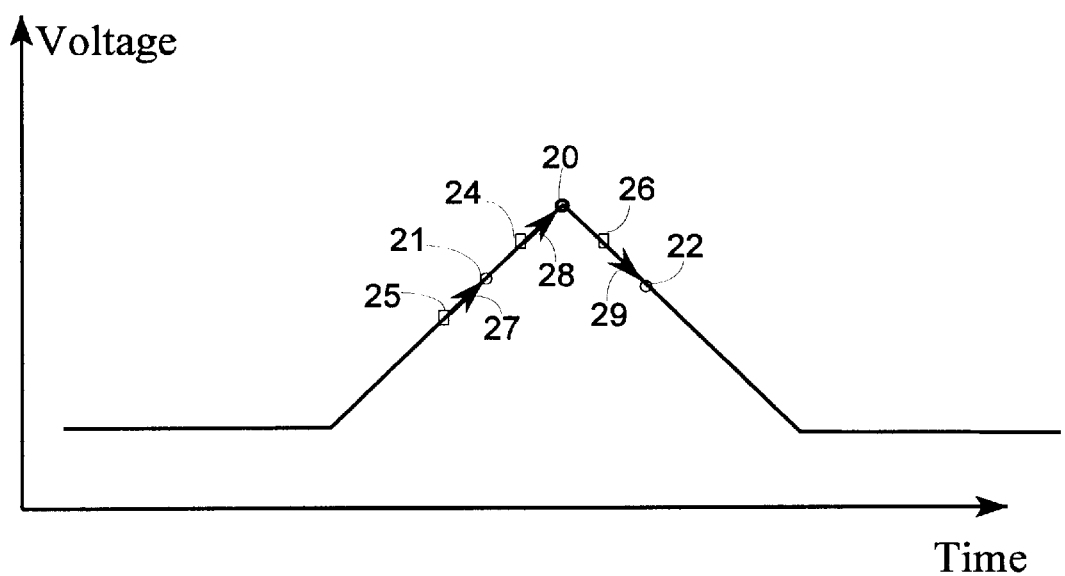
FIG. 2 is a graphical representation illustrating the particular points of operation of three correlators with respect to the correlation function for two different pre-detection intervals.
Figure 3:
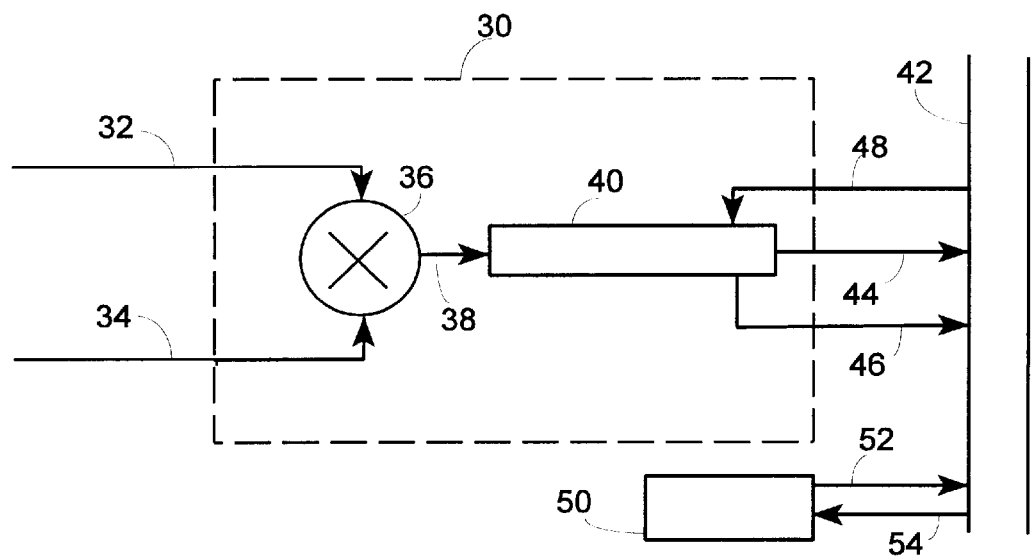
FIG. 3 is a diagram of a correlator including input and output signals and connections of the correlator to a controller in the receiver in accordance with one embodiment of the present invention.

FIG. 3 illustrates a correlator circuit according to one embodiment of the present invention. Correlator 30 receives two input signals, a received signal 32 and a reference signal 34. Each signal is sent to a different input of multiplier 36 which correlates the received signal 32 with the reference signal 34 to generate a correlation signal 38. The signals can be encoded by one or more bits. Multiple bits improve the signal-to-noise ratio, but require more gates for processing. In one embodiment, two bit encoding is used which improves the signal-to-noise ratio by 1.4 decibels over one bit encoding. The correlation signal 38 is output to the correlator's accumulator 40. The accumulator 40 is double buffered, that is, the accumulator has two registers, one for accumulating and one for reading. Thus, the accumulation in accumulator 40 from one pre-detection interval can be read from the receiver's bus 42 via line 44 while the accumulator is accumulating for the next pre-detection interval. Accumulator 40 also outputs an overflow indication to the bus 42 on line 46 and can receive a reset command from the bus on line 48. A controller 50 is also connected to bus 42 via lines 52 and 54.

This correlator circuit permits several different ways of operating the correlator in accordance with the present invention. In one embodiment the controller 50 is periodically interrupted to read the accumulator 40 and to add the accumulated result to an accumulated total stored in the controller's memory. After reading the accumulator 40, the controller 50 can reset the accumulator via line 48. The time period between interrupts is chosen to be small enough so that the accumulator cannot overflow during the period, that is, so that the maximum power allowed by the receiver hardware for the received signal 32 if accumulated via the correlation signal 38 will not cause an overflow. In one implementation of this embodiment which used a pre-detection interval of 5 milliseconds, interrupts for reading the accumulator 40 every 1 millisecond were sufficient to prevent overflow from occurring.

Figure 4:
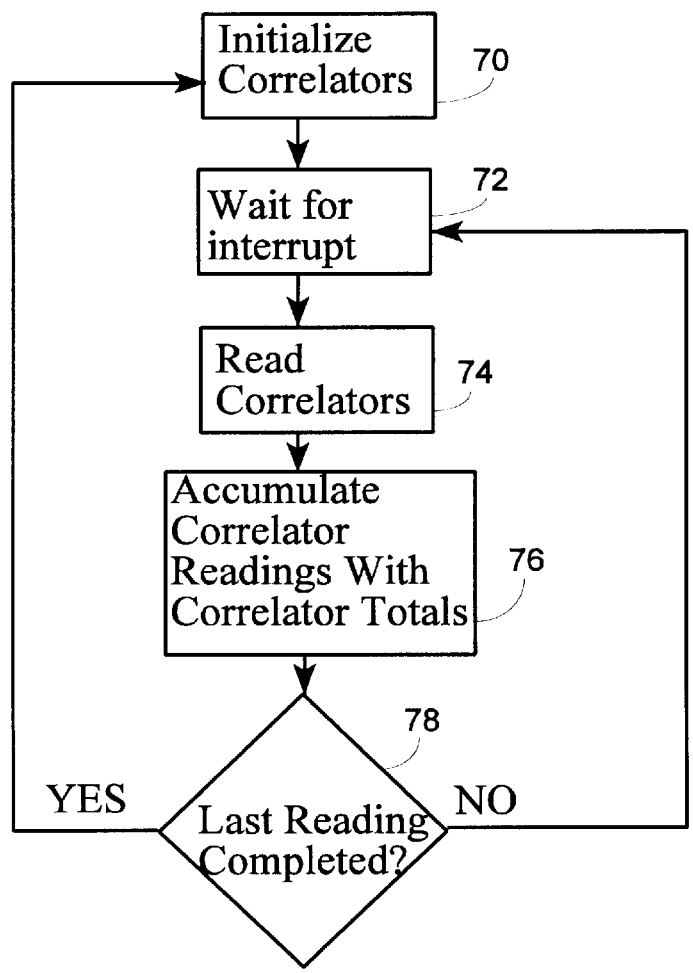
FIG. 4 is a flowchart of a method for performing one embodiment of the present invention in which the correlators are read more than once in a pre-detection interval.

FIG. 4 graphically illustrates another procedure for operating a multiple correlator embodiment of the present invention even if overflow does occur. In step 70, a controller resets or initializes all the hardware accumulators to zero. In step 72, the correlators are turned on and each accumulator begins to accumulate the correlation signal output from the respective correlator while the controller performs other tasks or waits for an interrupt. In step 74, the controller is interrupted and reads each hardware accumulator. In step 76, the accumulated results from the correlators are added to a respective accumulated total in the controller memory for each correlator. However, if the accumulator has overflowed, the controller corrects the accumulated result before adding the result to the accumulated total. In step 78, the controller determines if the pre-detection interval has completed. If not, the operation returns to step 72. Otherwise, the controller resets the accumulators for the next pre-detection interval. Although the circuit in FIG. 3 provides an overflow indication on line 46, the controller can also detect overflow if the accumulated result read for one interrupt is less than the prior reading. These procedures presume that either a dedicated controller is provided to handle the interrupts or that another controller in the receiver has enough time to perform the necessary readings and to total accumulations at the required interrupt intervals.

Another embodiment of the present invention takes advantage of the way the accumulated results are used to significantly reduce the amount of time required of a controller for servicing any interrupts. For example, co-pending U.S. application Ser. No. 08/629,963 filed on Apr. 9, 1996, which is incorporated here by this reference, describes a receiver in which the correlation signals are used to calculate an estimate for multipath at the end of each pre-detection interval. One equation for determining this estimate is set forth as:

$$MP = k \times [1 - LI/PI]$$

where MP is the multipath error, k is a constant, LI is the late in-phase accumulated result and PI is the punctual in-phase accumulated result. The present invention recognizes that this equation only requires a ratio of two accumulated results, that is, LI divided by PI. Therefore, an incomplete reading, that is, before the pre-detection interval terminates will still provide valid information so long as both measurements are made at the same time and enough power from the respective correlation signal has been accumulated to discern the desired spread spectrum signal over any noise in the received signal. In such an instance, the ratio would remain unchanged and a valid multipath estimate can be made.

To take full advantage of the number of bits provided in each accumulator, such an abbreviated reading of the accumulators should be made at the last possible instant when an accumulator overflows. Therefore, if an overflow bit from an accumulator is used to interrupt the controller via lines 46, 54 and bus 42, the accumulators can be read at precisely the time the overflow occurred and valid information about the signals can be generated from the results. Although in FIG. 3, the controller 50 is connected to correlator 30 via bus 42, a directly connected controller, which can be dedicated hardware circuitry, is also envisioned by the present invention.

Not all accumulators overflow at the same time. For example, one receiver has four correlators producing the following correlation signals: (EI–LI), PI, EI, and PQ. For code tracking, in this example, the goal is to drive (EI–LI) to zero while for carrier tracking the goal is to drive arctangent(PQ/PI) to zero. If the carrier-to-noise ratio is high enough in steady state, the EI and PI accumulators will limit or overflow at approximately the same time, but the (EI–LI) accumulator will most likely continue to operate without overflow for the entire correlation period since the (EI–LI) correlation signal will tend toward zero. Accordingly, if a controller stops the accumulation of the EI and PI correlation signals and takes a reading of the accumulated results, but does not stop the accumulation of the (EI–LI) signal, erroneous calculations based on the accumulated results will be performed. As another example, in the multipath equation above LI and PI are used. However, while the PI accumulated result is measured directly and may have overflowed, LI is derived from the (EI–LI) accumulated result which most likely did not overflow. LI is calculated as (–(EI–LI)+ EI). The result would therefore be an erroneous multipath estimate.

Figure 5:
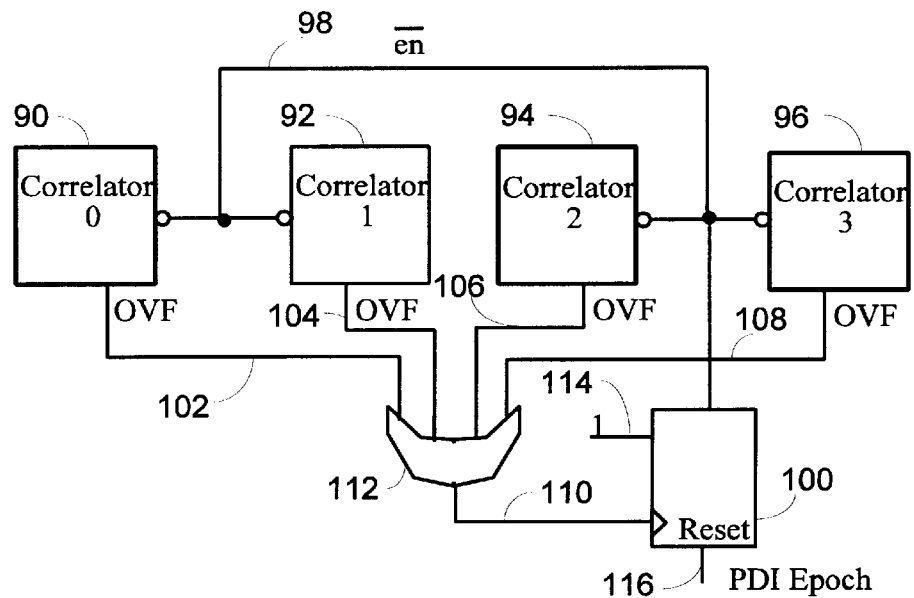
FIG. 5 is a diagram of a circuit for performing one embodiment of the present invention in which all the correlators are enabled/disabled simultaneously.

In one embodiment of the present invention, to ensure that all the accumulators in a channel stop accumulating at the same time any one of the accumulators has overflowed, an enable/disable line is connected to all the accumulators and a dedicated controller is provided solely for this task. FIG. 5 illustrates such a channel circuit for an application specific integrated circuit (ASIC). This particular circuit has four correlators 90, 92, 94, 96 for each channel. Each correlator is connected to a common enable line 98 which is output from a controller 100 and to an overflow output line 102, 104, 106, 108. Controller 100, which may be a simple flip flop, is connected to a reset line 110 from quad OR gate 112, a fixed "1" value 114 and a pre-detection interval epoch signal line 116. Also, each overflow line 102, 104, 106, 108 is connected as an input of the quad OR gate 112.

In operation, each correlator 90, 92, 94, 96 correlates a different reference signal or version of a reference signal with the received satellite signal and outputs an accumulated result which indicates how closely the respective reference signal is aligned with the received satellite signal. When one or more correlators overflow, the respective overflow line 102, 104, 106, 108 receives a disable command from the correlator, in this example, a "1" instead of a "0". The quad OR gate 112 output 110 changes to a "1", a disable command and the channel controller 100 resets causing all the correlators 90, 92, 94, 96 to be disabled via the common enable line 98. The accumulators then can be read at any time before the next pre-detection interval would overwrite this pre-detection interval's accumulated results. Thus, because all four correlators are inhibited at the same time if any one correlator accumulator overflows the relative proportions of the accumulated results are maintained. Accordingly, the pre-detection interval can be set to values in which a "high" carrier-to-noise ratio causes the correlators to overflow. So long as the code and carrier tracking loops and multipath estimates, if any, use equations which employ the proportional relationships of the accumulated results from the correlation signals (which includes most modern receivers), the present invention provides a receiver which operates without the penalty of adding extra bits to the correlator accumulators in hardware. In addition, because the pre-detection interval is variable, when the received signal does not cause overflow, a receiver embodying the present invention will have no signal-to-noise performance degradation.

One advantage in using the present invention occurs with high power pseudolites. A high power pseudolite is a ground based GPS satellite signal generator. Since such pseudolites are generally much closer to a receiver than GPS satellites orbiting at 20,000 kilometers above the earth, the received signals from such generators is relatively strong and easily causes accumulator overflow. Typically, with pseudolites, if the carrier-to-noise ratio is 65 decibels-Hertz, EI and PI limit early within the pre-detection interval period while (EI–LI) and PQ correlate over the entire period. Any normalization in the code and carrier tracking loops would be inaccurate because of this overflow. With this embodiment of the present invention, all the correlators are turned off at the same time so that the controller can accurately perform any required normalization.

Although this embodiment of the present invention reduces the pre-detection interval so that all correlation ceases when one or more of the correlators limit, this reduction does not affect the carrier-to-noise ratio, which is calculated based on the instantaneous signal power at particular points in time. However the early termination of the pre-detection interval does reduce the signal-to-noise ratio (SNR), which is based on the accumulated results, as shown:

$$SNR = \frac{A^2}{\sigma^2} = 2 \times \frac{C}{N_o} \times T$$

where $C/N_o$ is the carrier-to-noise ratio in decibel Hertz, T is the pre-detection interval in seconds, $A^2$ is the signal power in Volts$^2$, and $\sigma^2$ is noise power in Volts$^2$. By terminating the pre-detection interval earlier, T is reduced and the signal-to-noise ratio is reduced. For some receivers, a lower signal-to-ratio is acceptable, for example, if the cost of manufacturing the receiver is reduced. Thus, the present invention provides means for reducing the number of bits required in correlator accumulators, but how few bits should be provided is chosen based on the signal-to-noise ratio requirements for a particular receiver.

Figure 6:
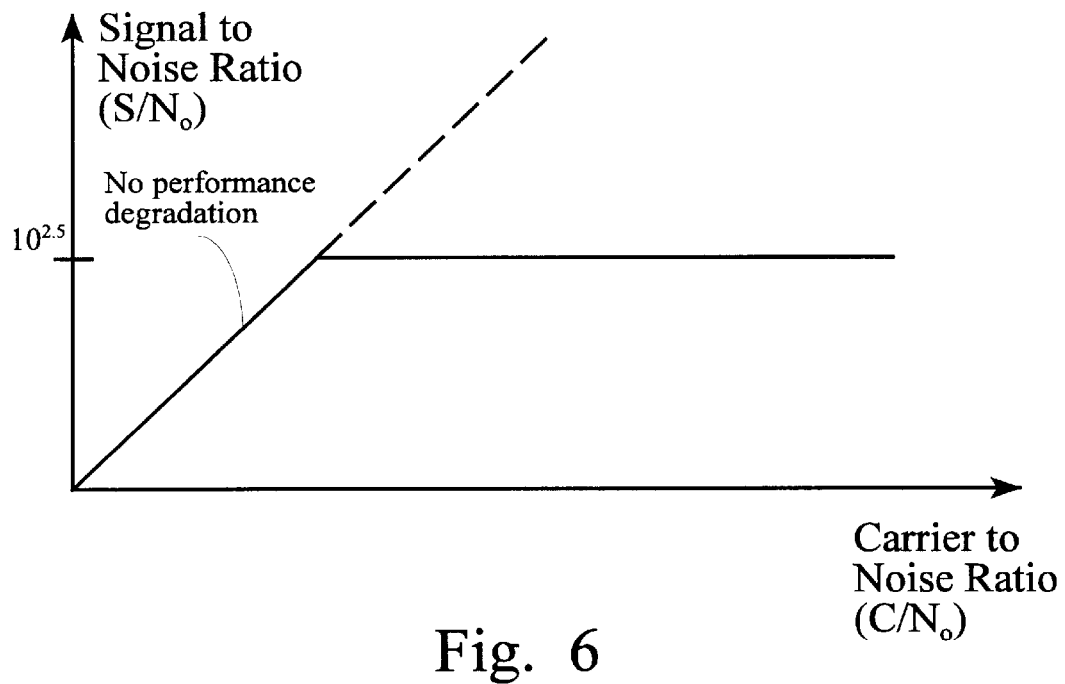
FIG. 6 is graphical representation of the relationship between the signal-to-noise ratio and the carrier-to-noise ratio which is provided by one embodiment of the present invention.

Theoretically, the present invention allows for a one-bit accumulator. More realistically, if an accumulator limits with a carrier-to-noise ratio of 54 decibels-Hertz and the pre-detection interval is set to 5 milliseconds, the channel limits with a signal-to-noise ratio of 34 decibels. However, in some typical receivers, acceptable performance occurs with a signal-to-noise ratio of 25 decibels or greater. Also, according to the present invention, the number of bits in the accumulators can be reduced, saving integrated circuit (IC) area and power without compromising the lower end carrier-to-noise ratio performance at all. FIG. 6 illustrates that for lower carrier-to-noise ratios, the pre-detection interval remains at 5 milliseconds because the limit for the lower carrier-to-noise ratios is not reached. Only at higher carrier-to-noise ratios is the signal-to-noise ratio limited.

The above invention has been described with specific embodiments, but a person skilled in the art could introduce many variations on these embodiments without departing from the spirit of the disclosure or from the scope of the appended claims. The embodiments are presented for the purpose of illustration only and should not be read as limiting the invention or its application. Therefore the claims should be interpreted commensurate with the spirit and scope of the invention.

What is claimed is:

1. A method for obtaining information about a data signal while aligning a reference signal with the data signal comprising the steps of:

comparing the data signal and the reference signal;

generating a correlation signal from the comparison;

accumulating the correlation signal into an accumulated results;

continuing to accumulate the correlation signal into the accumulated result after an overflow condition has occurred;

reading the accumulated result after the overflow condition has occurred;

adjusting the accumulated result to generate an adjusted result which accounts for the overflow condition; and generating the information about the data signal from the adjusted result.

2. A method according to claim 1, wherein the overflow condition is the second overflow of the accumulated result.

3. A method according to claim 1, wherein the step of adjusting the accumulated result further comprises the step of:

adjusting the accumulated result to correct for the overflow condition.

4. A method according to claim 1, further comprising the step of:

accumulating the accumulated result in an accumulated total; and adjusting the accumulated total to correct for the overflow condition.

5. An apparatus for obtaining information about a data signal while aligning the data signal with a reference signal comprising:

a correlator which receives the data signal and the reference signal and which generates a correlation signal from a comparison of the data signal and the reference signal;

an accumulator which receives the correlation signal and includes the correlation signal in an accumulated result, the accumulator continuing to accumulate the correlation signal into the accumulated result after an overflow condition has occurred;

an adjustment controller which reads the accumulated result and generates an adjustment for the accumulated result after the overflow condition has occurred; and an information controller which generates the information about the data signal according to the accumulated result and the adjustment.

6. An apparatus according to claim 5, wherein the overflow condition is a second overflow of the accumulated result.

7. An apparatus according to claim 5, wherein the apparatus further comprises:

an overflow control which receives overflow indications from one or more accumulators and generates an overflow condition signal.

8. A method for obtaining information about a data signal while aligning the data signal with a reference signal comprising the steps of:

selecting a time period having a start and an end as a pre-detection interval;

correlating the data signal with the reference signal for accumulation in an accumulated result during the pre-detection interval, the pre-detection interval terminating before the end of the time period according to an overflow condition; and generating select information about the data signal from the accumulated result, the select information being unchanged by the pre-detection interval terminating before the end of the time period.

9. The method of claim 8, wherein the select information relates to a ratio of one or more accumulated results.

10. The method of claim 8, wherein the data signal is a GPS signal.

11. The method of claim 8, wherein the select information concerns multipath information.

12. The method of claim 8, further comprising the step of:

determining the start and the end of the time period in accordance with a selected carrier-to-noise ratio.

13. An apparatus for obtaining information from a data signal while aligning the data signal with a reference signal comprising:

a correlator which correlates the data signal with the reference signal to generate a correlation result during a pre-detection interval, the pre-detection interval having a start and an end;

an accumulator which accumulates the correlation result as accumulated results during the pre-detection interval, the accumulator having an overflow indicator;

an overflow control which generates an overflow condition signal to terminate the pre-detection interval according to an overflow indication from the overflow indicator; and an information controller which generates select information about the data signal from the accumulated results, the select information unchanged when the overflow control terminates the pre-detection interval before the end of the pre-detection interval.

14. An apparatus according to claim 13, wherein the select information concerns a ratio of one or more accumulated results.

15. An apparatus according to claim 13, wherein the data signal is a GPS signal.

16. An apparatus according to claim 13, wherein the select information includes multipath information.

17. An apparatus according to claim 13, wherein the pre-detection interval is determined in accordance with a selected carrier-to-noise ratio.

18. An apparatus according to claim 13, wherein the overflow control comprises:

one or more overflow indication inputs; and an overflow condition signal generator which generates the overflow condition signal in accordance with the overflow indication inputs.

19. An apparatus according to claim 13, further comprising:

additional correlators which correlate the data signal with respective versions of the reference signal to generate respective correlation results during the pre-detection interval;

additional accumulators which accumulate the respective correlation results during the pre-detection interval, each additional accumulator having a respective overflow indicator; and the overflow control generating the overflow condition signal to terminate the pre-detection interval according to an overflow indication from one or more of the overflow indicators.

20. An apparatus according to claim 17, wherein the accumulator is allocated a number of bits to achieve the selected carrier-to-noise ratio.

* * * * *